United States Patent
Bean et al.

(10) Patent No.: US 7,545,434 B2
(45) Date of Patent: Jun. 9, 2009

(54) VIDEO CAMERA WITH VARIABLE IMAGE CAPTURE RATE AND RELATED METHODOLOGY

(75) Inventors: Heather Noel Bean, Fort Collins, CO (US); Mark Nelson Robins, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1655 days.

(21) Appl. No.: 10/067,658

(22) Filed: Feb. 4, 2002

(65) Prior Publication Data

US 2003/0146981 A1    Aug. 7, 2003

(51) Int. Cl.
*H04N 5/235* (2006.01)
*G03B 7/00* (2006.01)

(52) U.S. Cl. .................................. 348/362; 348/229.1

(58) Field of Classification Search ................ 348/296, 348/312–322, 362, 14.01, 14.08, 229.1
See application file for complete search history.

(56) References Cited

U.S. PATENT DOCUMENTS

| | | | |
|---|---|---|---|
| 5,343,243 A | 8/1994 | Maeda | 348/222 |
| 6,097,879 A | 8/2000 | Komatsu et al. | 386/85 |
| 6,614,477 B1 * | 9/2003 | Lee et al. | 348/312 |
| 6,630,950 B1 * | 10/2003 | Ohkawara et al. | 348/208.12 |
| 6,710,809 B1 * | 3/2004 | Niikawa | 348/372 |
| 6,795,642 B2 * | 9/2004 | Matsumoto et al. | 386/109 |
| 6,856,345 B1 * | 2/2005 | Yamamoto et al. | 348/207.2 |

* cited by examiner

*Primary Examiner*—David L Ometz
*Assistant Examiner*—Kelly L Jerabek

(57) ABSTRACT

A camera with a selector device that may be used for adjusting frame rate while capturing video; and associated subsystems and methodologies.

14 Claims, 3 Drawing Sheets

VIDEO CAMERA WITH VARIABLE IMAGE CAPTURE RATE AND RELATED METHODOLOGY

BACKGROUND

Digital video cameras are devices that produce digital image data representative of a period of time in a scene. As used herein 'digital video camera' refers to any camera that generates such image data. 'Video' as used herein refers generally to a series of frames and associated timing information. The term video is used to refer to both a video display, i.e. the display of streamed frames, and also to video data, i.e. the digital information which may be stored or used to produce a video display. The term 'frame' as used herein refers to a single complete still image in a sequence of images that creates the illusion of motion within a scene when displayed in rapid succession (streamed). 'Frame' is also used to refer to digital information representative of the single still image. Frames within video are associated with a brief period of time equal to 1/fps. The term 'fps' is an abbreviation for frames per second; as used herein, 'fps' refers to the rate of video playback and/or recording speed of video.

A frame rate of 30 fps is often referred to in the art as 'real-time speed of video' because it has a high enough fps that the video appears 'smooth' to the human eye. For the Phase Alternating Line (PAL) standard established by the Nation Television Standards Committee adopted in Europe, the 'full-motion rate' is defined as 25 fps, each frame containing 576 horizontal lines by 768 pixels (i.e., there are 25 frames in each second of video, resulting in each frame representing ¹⁄₂₅ seconds of video). For the National Television Standard Committee (NTSC) standard adopted in America and Japan, the 'full-motion rate' is defined as 29.97 fps, each frame containing 480 horizontal lines by 640 pixels. A rate of 24 fps is generally considered acceptable for animation. At a slower rate of 12-15 fps, video appears 'choppy' to the human eye if moving objects are in the scene.

The video generated by a digital video camera may be transmitted to a memory device for storage or to an output device such as a video monitor or television that produces a replicated video of the sequential images of the scene.

Digital video cameras typically have optical elements, at least one two-dimensional photodetector array, a data storage device, a controller and a display, all of which are generally mounted to a camera housing. Non-limiting examples of digital video cameras are described in the following patents which are hereby incorporated by reference for all that is disclosed therein: U.S. Pat. No. 6,097,879 of Komatsu et al. issued on Aug. 1, 2000 under the title VIDEO CAMERA APPARATUS OF DIGITAL RECORDING TYPE and U.S. Pat. No. 5,343,243 of Maeda issued on Aug. 30, 1994 under the title DIGITAL VIDEO CAMERA.

The digital video camera optical elements serve to focus an image of a scene onto the camera's two-dimensional photodetector array. The optical elements typically comprise one or more lenses and/or reflectors. The two-dimensional photodetector array generates image data representative of the image of a scene imaged thereon. The controller serves to process the image data and to transfer the image data to and from the data storage device. The controller also serves to transfer image data to the display and/or an output device. Additionally, the controller may serve to sequence this image data for playback at a later time to produce video.

The two-dimensional photodetector array has a plurality of photodetectors typically arranged in closely positioned rows and columns. Each photodetector generates image data representative of a small portion of the optical image of the object focused on the photosensor array. The accumulation of image data generated by the plurality of photodetectors is representative of the entire image of the scene, similar to a mosaic representation of the image of the scene. Each photodetector outputs a data value which corresponds to the intensity of light it receives. The controller processes and arranges the image data generated by the plurality of photodetectors into a complete set of image data often referred to as a frame of a video. As sequentially captured sets of image data are collected, stored and/or played, they produce video.

Digital video cameras process frames at a relatively high rate of speed. As previously discussed, the frames are recorded and/or played at a frame rate (e.g., 30 fps). Each frame and timing data associated therewith, when stored separately, may require a relatively small amount of memory. However, when frames are stored sequentially as video, the sequence of frames often requires a large amount of data. Storage of this video may consume memory reserves relatively quickly when the frame rate is relatively high (e.g. 30 fps). Additionally, capturing, processing, storing and playing image data requires a significant amount of power. Portable digital video cameras have power supplies that have limited power storage (e.g. batteries), therefore only a limited amount video capture may be completed before stored power is depleted.

Conventional video cameras capture frames of video at a predetermined frame rate. This predetermined frame rate is preset at the time of manufacture or set by the user as a one-time-event. This one-time setting of the frame rate occurs prior to capturing video. Such one-time-event setting of frame rate may, for example, be at a lower fps setting (e.g. 6 fps), a higher fps setting (e.g. 40 fps), or the usual setting of about 30 fps. The lower fps setting is typically used in order to conserve memory and power reserves. The relatively high fps setting (e.g. 40 fps) is typically used in order to better capture scenes in which action occurs.

SUMMARY

In one embodiment, a camera user interface assembly may include: a video capture selector having at least a first operating state in which the camera captures image data at a first rate and a second user selectable operating state in which the camera captures image data at a second rate different from the first rate; the selector being switchable between the first and second states during continuous image data capture.

In another embodiment, a method of operating a camera may include: actuating a variable-frame-rate-trigger by variation of operation of at least one operating parameter; determining a capture frame rate as a function of the operating parameter; and capturing image data at the capture frame rate.

In another embodiment, a method of operating a camera may include: actuating a variable-frame-rate-trigger with a first user input and in response thereto capturing a first plurality of images having a first frame rate; actuating the variable-frame-rate-trigger with a second user input, wherein the second user input is different from the first user input and in response to the second user input capturing a second plurality of images having a second frame rate, wherein the second frame rate is dependent on the second user input, and the second frame rate is different from the first frame rate; and storing the first and second pluralities of images at the first frame rate and the second frame rate, respectively.

In another embodiment, a method of creating and displaying video of an object may include: imaging the object on a photodetector array; in response to a first user input applied to a variable-frame-rate-trigger: generating a first image data set representative of the object; then waiting a first period of time, then generating a second image data set representative of the object immediately after the first period of time; in response to a second user input applied to the variable-frame-rate-trigger, wherein the second user input is different then the first user input: generating a third image data set representative of the object; then waiting a second period of time, then generating a fourth image data set representative of the object immediately after the second period of time, wherein the second period of time is different than the first period of time; streaming at least the first image data set, the second image data set, and streaming the third image data set and the fourth image data set.

In another embodiment, a method of capturing image data with a camera may include: determining a frame rate for future image capture based upon a user input provided while the camera is simultaneously capturing image data; then capturing further image data at the determined frame rate; and storing the captured image data.

In another embodiment, a camera user interface may include: means for capturing frames at a frame rate; means for selectively varying the frame rate while capturing the frames; and means for storing the captured frames.

DETAILED DESCRIPTION

Figure 1:
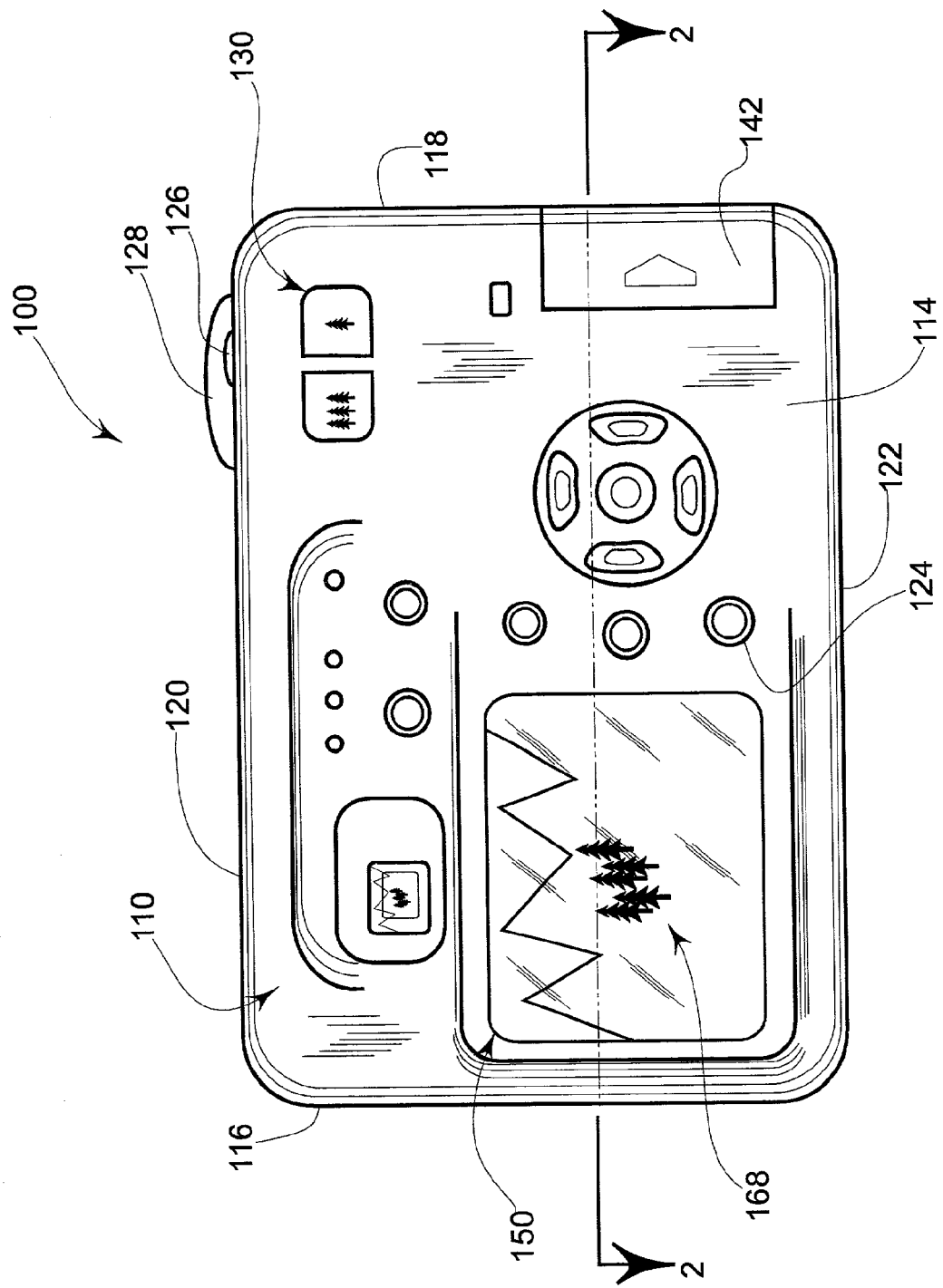
FIG. 1 is a rear view of a camera.

FIG. 1 shows a digital video camera 100 having a housing 110. The housing 110 may have a front 112 (FIG. 2), a back 114, a left side 116, a right side 118, a top 120 and a bottom 122. The camera 100 may be provided with a plurality of user interfaces such as, by way of example and not limitation, a mode button 124, a power button 126 and a zoom toggle device 130 for operating the camera 100. The camera 100 also includes a variable-frame-rate-trigger 128. The term 'variable-frame-rate-trigger' as used herein means any selector device that may be used for adjusting a frame rate while continuously capturing video. The variable-frame-rate-trigger 130, sometimes referred to as a 'fps selector' herein, may employ various types of selector mechanisms including, but not limited to, force detectors, pressure sensitive switches, speed sensors, displacement sensors, closed contact counters, azimuth position sensors, dials and other rotary devices such as potentiometers, slide switching devices, or any other devices now known or later developed that allows a user to control the frame rate of the camera 100 through selective operation thereof based on selective operation thereof. Additionally, it is noted that the variable-frame-rate-trigger 128 is shown on the housing top portion 120. However, the variable-frame-rate-trigger 128 may be provided on other portions of the camera 100 (e.g. housing front 112, housing left 116, housing right 118, etc.).

Figure 2:
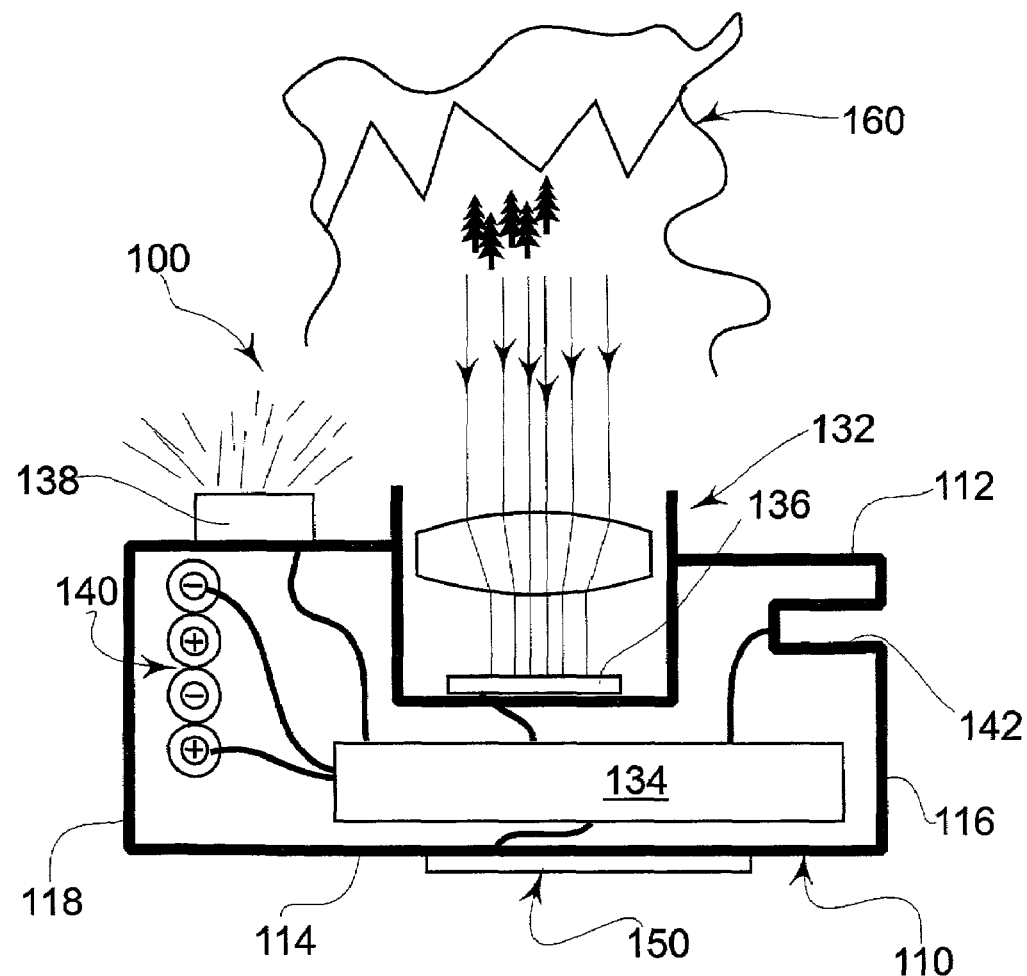
FIG. 2 is a schematic cross-section, plan, schematic view of the camera taken across plane 2-2 of FIG. 1.

With reference to FIG. 2, the camera 100 may include a lens assembly 132, a controller 134 and a photosensor array 136. The photosensor array is typically one or more two-dimensional arrays. When used for color video the imaging light beam may be focused onto one photosensor array or may be split into multiple beams for generating multiple color component data sets by focusing the multiple beams onto a plurality of photosensor arrays. As used herein 'photosensor array' refers to both single array and multiple array type photosensor assemblies. The camera 100 can include other components such as a flash 138, a power supply 140, a storage media interface 142 and a display 150. The lens assembly 132 may be mounted to the camera housing front 112 in optical communication with the photosensor array 136. Light passing through the lens assembly 132 forms an image of an object 160 on the photosensor array 136. The controller 134 generates image data (also referred to as a frame of video) representative of the image of the object formed on the photosensor array 136 in a manner previously described and well known in the art. A plurality of images generated in sequence by the controller 134 may be streamed together to generate video in a manner described later herein. The photosensor array 136 and other components such as the flash 138, the power supply 140 and the storage media interface 142 may be placed in electronic communication with the controller 134 by conventional electronic interfaces such as conductor wires, circuit boards, etc.

Figure 3:
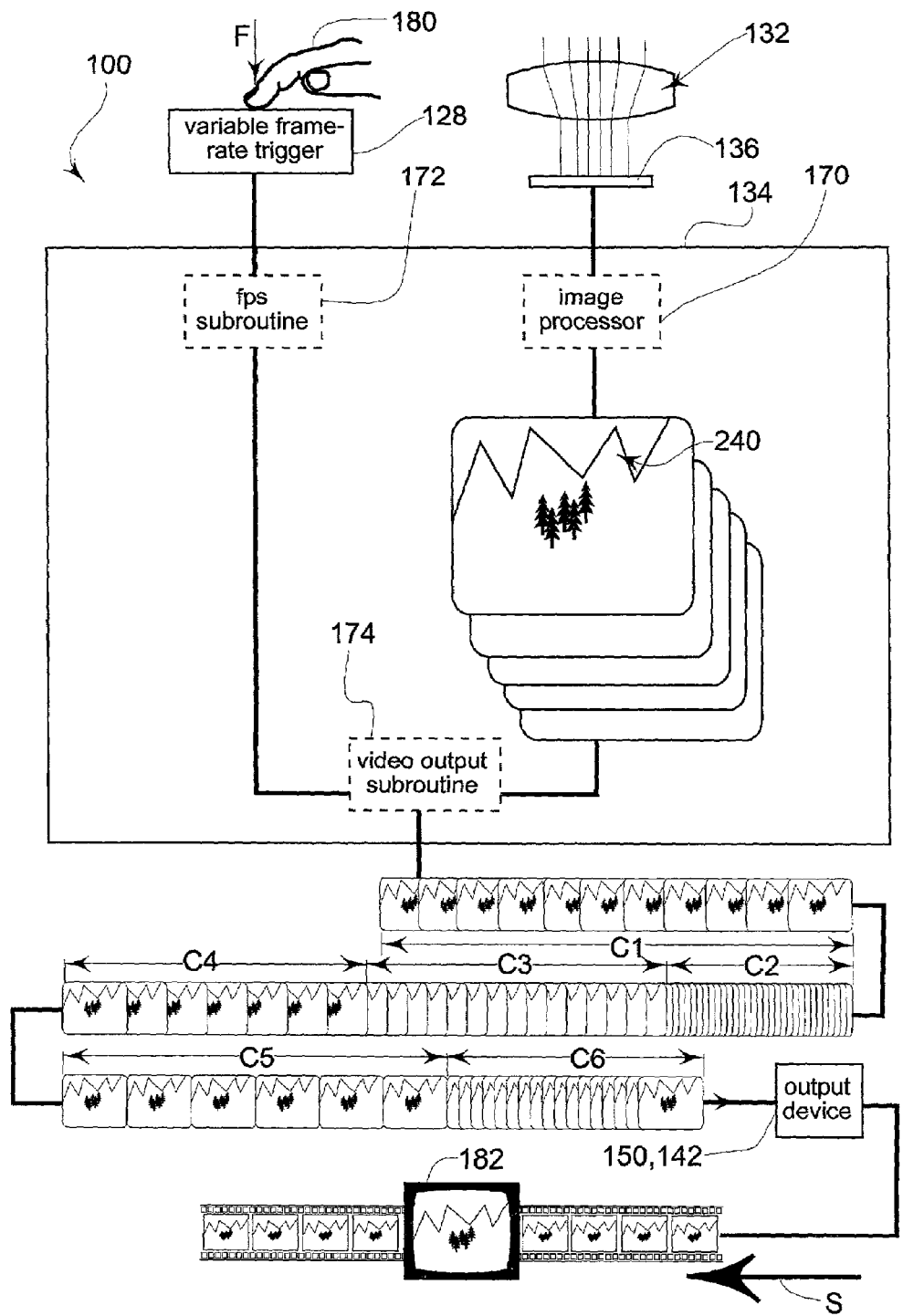
FIG. 3 is a flow chart showing certain features and operations of a camera.

As shown schematically in FIG. 3, the camera controller 134 may include an image processor 170 and a fps subroutine 172. The fps subroutine may be an image capture algorithm. The image processor 170 and the fps subroutine 172 may be components operationally associated with the controller 134 or embedded within the controller 134. In the event that the image processor 170 and the fps subroutine 172 are embedded in the controller 134, they may be firmware or software operationally configured within the controller 134. The controller 134 may further include a video output subroutine 174. The video output subroutine 174 may process the image data provided by the image processor 170 in a manner directed by the fps subroutine 172. Such processing of the image data by the video output subroutine 174 may dictate the frame rate at which the individual frames of the video are sent to output devices (e.g. media storage interface 142, display 150, or other output devices that are now know to those skilled in the art or that are later developed).

With continued reference to FIG. 3, the variable-frame-rate-trigger 128 may be operated by a user to vary the frame rate of video while video is being captured. In one embodiment, the user's finger 180 applies a different amount of force 'F' to the variable-frame-rate-trigger 128 select different frame rates. Such different frame rates are represented as video capture 1 'C1', video capture 2 'C2', video capture 3 'C3', video capture 4 'C4', video capture 5 'C5' and video capture 6 'C6'. In this schematic representation, the individual video captures (e.g. C1, C2, C3, C4 . . . ) span equal periods of time (e.g. 1 second). Therefore, assuming the illustrated time periods of the video captures are equal and 1 second in duration, the frame rate of capture C1 is 11 fps, the frame rate of capture C2 is 31 fps, the frame rate of capture C3 is 15 fps, the frame rate of capture C4 is 7 fps, the frame rate of capture C5 is 6 fps and the frame rate of capture C6 is 17 fps. These exemplary frame rates are provided as non-limiting examples of frame rates that may be implemented in a particular camera. Those skilled in the art will appreciate that relatively slower (e.g. 1 fps) or relatively faster (e.g. 100 fps) frame rates could be implemented. The possible selections could be discrete step amounts or could be continuously variable.

The schematic representation of frame rate capturing of video shown in FIG. 3 illustrates that the camera 100 may be operated via the variable-frame-rate-trigger 128 to capture faster video (e.g. video capture C2) or slower video (e.g. video capture C5). A user may be provided with feedback to inform him/her of his/her selected rate such as variable pressure, audible clicks associated with discrete speeds, a variable speed beep proportionate to the selected speed, a variable pitch, or other audio signal associated with different speeds. Additionally, the user may be provided with feedback in the form of indicia displayed on the camera display 150 or other sensory feedback as those skilled in the art will appreciate upon reading the present disclosure.

As shown in FIG. 3, the video provided by the video output subroutine 174 may be played on an output device such as a television 182. Video played on the television 182 may play at a constant playback speed 'S'. When played at the constant playback speed S, the playback frame rate varies as a function of the capture frame rate. In the exemplary scenario provided in FIG. 3, if captures C1, C2, C3, C4, C5 and C6 are played back in sequence, the video is 6 seconds in duration. A total of 87 frames are played back during this six second video. During the first second, 11 frames are shown on the television 182. During the second second, 31 frames are shown. During the third second, 15 frames are shown. During the fourth second, 7 frames are shown. During the fifth second, 6 frames are shown. And, during the sixth second, 17 frames are shown. With this six second long video, some portions of the video contain more frames then other portions (e.g. the 2$^{nd}$ second of video contains 31 frames, while the 5$^{th}$ second of video contains 6 frames). Therefore, some portions of the video contain more detail (e.g. the second second, capture C2) than other portions of the video (e.g. the fifth second, capture C5).

Having described exemplary features of one embodiment of a camera 100 having a variable-frame-rate-trigger 128, the operation thereof will now be described in further detail.

With reference to FIG. 2, at the outset a user may desire to capture video of a scene. In this exemplary scenario, the scene is a picturesque mountain scene 160 having at least one object therein that moves (e.g. a bird flying from a nest in a tree). The user may depress the power button 126 in order to 'turn-on' the camera 100. The user may then invoke a variable frame rate video capture mode by depressing mode button 124. While in the variable frame rate video capture mode, the user may direct the video camera 100 to capture video at varying frame rates via the variable-frame-rate-trigger 128.

The user prepares for video capture by pointing the video camera at the scene 160, thereby imaging the scene 160 onto the photosensor array 136 through the lens assembly 132. To capture video, the user depresses the variable-frame-rate-trigger 128 with his/her finger 180 at a force 'F'. The video camera 100 captures video at a frame rate dependent, in this embodiment, on the magnitude of the force F.

In this exemplary scenario, the user may witness a bird sitting in a nest (not shown) within the mountain scene 160. Assuming that relatively little action is occurring in the scene 160, the user may desire to minimize memory and power usage. Therefore, the user requires a relatively slow frame rate (e.g. 5 fps) of video. In order to capture the slow frame rate of video, the user pushes the variable-frame-rate-trigger 128 with a force F of F1. While capturing this video at the relatively slow frame rate, the user notices that a second bird (not shown) has entered the scene 160 and is flying at a high speed. The user desires to capture this flying bird and is willing to expend memory and power in order to capture the event. The user may then increase the force F to F2 (i.e., F1 is less then F2) exerted by his/her finger 180 onto the variable-frame-rate-trigger 128. By increasing the force F to F2, the variable-frame-rate-trigger 128 receives the user's directive to notify the fps subroutine 172 of the user's desire to increase the frame rate of the video capture. The fps subroutine 172 determines the capture rate that correlates to the magnitude of the force F (e.g. F2). In this exemplary scenario, the second bird is simply flying around the scene 160, therefore the user desires only a slight increase in frame rate (e.g. 15 fps). During this period, video is captured at the slightly increased frame rate while the user maintains the force F2 exerted on the variable-frame-rate-trigger 128. While capturing the video at the slightly increased frame rate, the user notices that the first bird appears to be preparing to fly from the nest to meet the second bird. The user desires to capture this event in great detail. An increase in the frame rate will increase this detail. Therefore, the user increases the force F exerted on the variable-frame-rate-trigger 128 to a third force F3 (i.e. F1 is less then F2, which are both less then F3). By increasing the force F to F3, the frame capture rate is increased to a higher rate (e.g. 40 fps). The user may continue this increased force F until the event is thoroughly recorded, ceases to exist, or if the memory or power supply is depleted. This video may be viewed immediately on an output device such as display 150 or television 182, or may be stored on a device such as the storage media device 142 for later viewing. The described trigger is 'relatively progressively actuatable' meaning that as the actuating parameter, in this case force 'F', is progressively changes the fps is also progressively changed.

Another exemplary use of camera 100 is in the capture of sporting events (e.g. baseball). For example, a user may record a pitcher pitching a baseball towards a batter. The user may direct the camera to record relatively minimal detail (i.e. slow fps) while the pitcher prepares to throw the pitch. However, just before the baseball is thrown, the user may direct the camera to record a relatively detailed video (i.e. high fps). Such variance in the frame rate of the video capture is controlled by the user via the variable-frame-rate-trigger 128 in a dynamic manner while recording video and thus does not require the user to stop recording, reset the speed, and possibly entirely miss the pitch or the wind up as would be likely if he/she were using a conventional video camera.

While illustrative and presently preferred embodiments of the invention have been described in detail herein, it is to be understood that the inventive concepts may be otherwise variously embodied and employed and that the appended claims are intended to be construed to include such variations except insofar as limited by the prior art. For example, although a camera with a single selector for both initiating video capture and selecting the frame rate thereof has been specifically described it would be appreciated by those skilled in the art that these functions could be performed with multiple buttons or switches rather than one. For example, a central button could be used to activate video capture at a normal speed and a ring around the button could be rotated in one direction to increase speed and in another direction to decrease speed.

What is claimed is:

1. A camera user interface assembly comprising:
   a video capture selector having at least a first operating state in which said camera captures image data at a first rate and a second user selectable operating state in which said camera captures image data at a second rate different from said first rate;
   said selector being switchable between said first and second states during continuous image data capture.

2. The assembly of claim 1 wherein said selector is relatively progressively actuatable.

3. The assembly of claim 2 wherein said selector operates through variation of at least one operating parameter, said at least one operating parameter comprising at least one of:
   switching time, force magnitude, displacement speed, amount of displacement, number of closed contacts, azimuth position and potentiometer resistance.

4. The assembly of claim 1 wherein said selector operates through variation of at least one operating parameter, said at least one operating parameter comprising at least one of:
   force magnitude, displacement speed and number of closed contacts.

5. The assembly of claim 1 wherein said selector operates through variation of the operating parameter comprising force magnitude.

6. The assembly of claim 1 and further comprising:
   feedback of selection of said first rate or said second rate.

7. The assembly of claim 6 wherein said feedback comprises at least one of:
   audio notification and visual notification.

8. A method of capturing image data with a camera comprising:

determining a frame rate for future image capture based upon a user input provided while the camera is simultaneously capturing image data;

then capturing further image data at said determined frame rate; and storing said captured image data.

9. A camera user interface comprising:

means for capturing frames at a frame rate;

means for selectively varying said frame rate while capturing said frames; and means for storing said captured frames.

10. The camera user interface of claim 9 and further comprising:

means for notifying of said frame rate.

11. A method of operating a camera, said method comprising:

causing said camera to initiate image data acquisition by actuating a switch located on the exterior of said camera;

causing said camera to vary the frame rate at which image data is acquired by selectively operating said switch; and wherein said causing said camera to vary the frame rate at which image data is acquired occurs while said camera is acquiring image data.

12. The method of claim 11 and further comprising:

causing said camera to stop image data acquisition by discontinuing actuation of said switch.

13. The method of claim 11 wherein said selectively operating said switch comprises applying a varying force to said switch.

14. The method of claim 13 and further wherein:

increasing the level of force applied to said switch causes said frame rate to increase.

* * * * *

UNITED STATES PATENT AND TRADEMARK OFFICE
CERTIFICATE OF CORRECTION

PATENT NO. : 7,545,434 B2
APPLICATION NO. : 10/067658
DATED : June 9, 2009
INVENTOR(S) : Heather Noel Bean et al.

Page 1 of 1

It is certified that error appears in the above-identified patent and that said Letters Patent is hereby corrected as shown below:

On the face page, in field (75), in column 1, line 2, in "Inventors", delete "Greeley," and insert -- Fort Collins, --, therefor.

Signed and Sealed this

Third Day of November, 2009

David J. Kappos
*Director of the United States Patent and Trademark Office*